United States Patent [19]

Mayo

[11] Patent Number: 5,396,379
[45] Date of Patent: Mar. 7, 1995

[54] APPARATUS AND METHOD FOR REDUCING EFFECTS OF SLIP/STICK IN A DISK DRIVE HEAD ASSEMBLY

[75] Inventor: Mike J. Mayo, Palo Alto, Calif.

[73] Assignee: Maxtor Corporation, San Jose, Calif.

[21] Appl. No.: 979,600

[22] Filed: Nov. 20, 1992

[51] Int. Cl.$^6$ .............................................. G11B 5/596
[52] U.S. Cl. ........................ 360/78.07; 360/78.06; 360/78.04
[58] Field of Search .............. 360/78.06, 78.07, 78.09, 360/78.04; 369/44.29

[56] References Cited

U.S. PATENT DOCUMENTS

| | | | |
|---|---|---|---|
| 4,591,933 | 5/1986 | Quackenbush | 360/78.07 |
| 4,899,234 | 2/1990 | Genheimer | 360/78.06 |
| 5,119,250 | 6/1992 | Green et al. | 360/78.06 |
| 5,126,897 | 6/1992 | Ogawa et al. | 360/78.09 |
| 5,150,266 | 9/1992 | Albert | 360/78.04 |
| 5,220,547 | 6/1993 | Yasukawa et al. | 360/78.04 X |

OTHER PUBLICATIONS

National Technical Report, Apr. 1989, Moriya et al., "CMF Actuator High Speed Access System". pp. 165–171.

*Primary Examiner*—Aristotelis Psitos
*Assistant Examiner*—James T. Wilson
*Attorney, Agent, or Firm*—Blakely, Sokoloff, Taylor & Zafman

[57] ABSTRACT

A disk storage system having a mechanism for minimizing effects of slip/stick in a disk drive head assembly. A transducer is used to read data from and write data to a rotating disk. An actuator assembly holds the transducer. The actuator assembly is comprised of a load member onto which a flexure is attached. A slider is mounted onto the flexure. The transducer is mounted onto the slider. In this manner, the transducer can pitch and roll to maintain a constant height in reference to the disk's surface. A servo mechanism controls the acceleration and deceleration of the head according to a predetermined seek profile specifying how the transducer is to be moved for a particular seek. As the transducer approaches the destination track, the profile calls for a sudden deceleration surge in order to compensate for misalignments occurring during the seek due to the flexure slipping laterally in reference to the load member and sticking in that position because of friction.

7 Claims, 8 Drawing Sheets

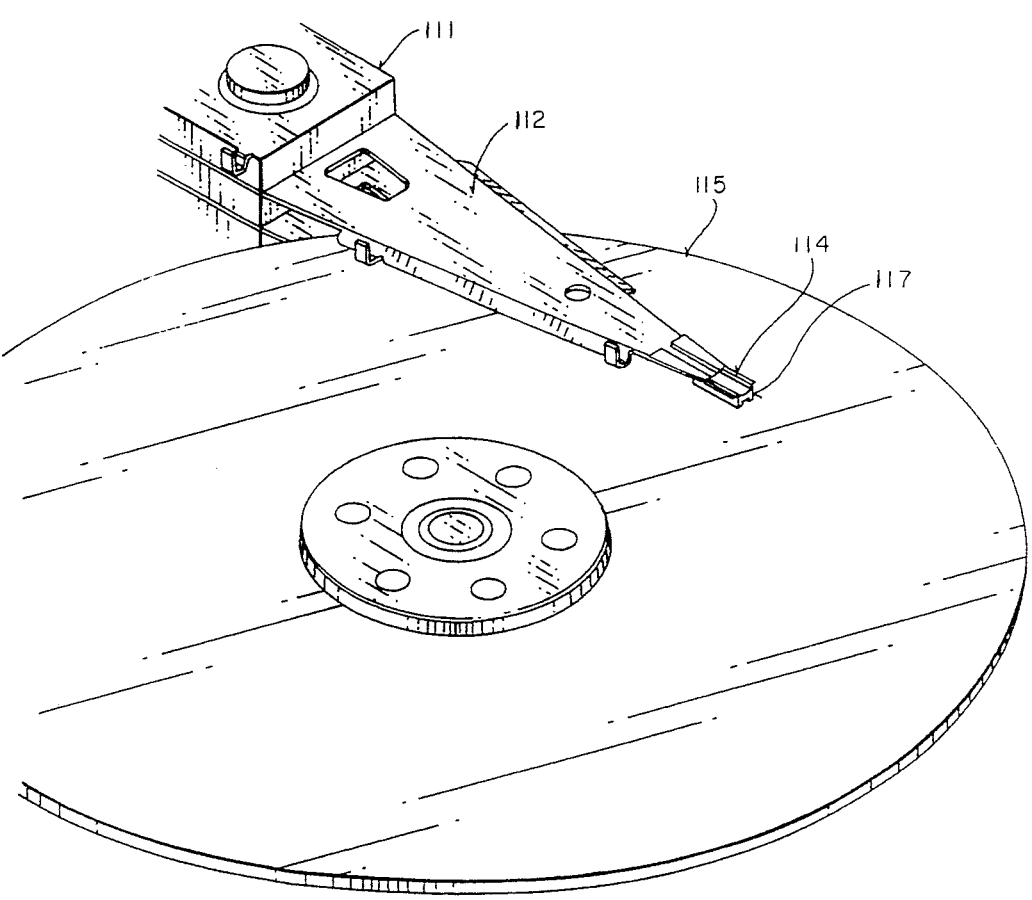
FIG _ 1

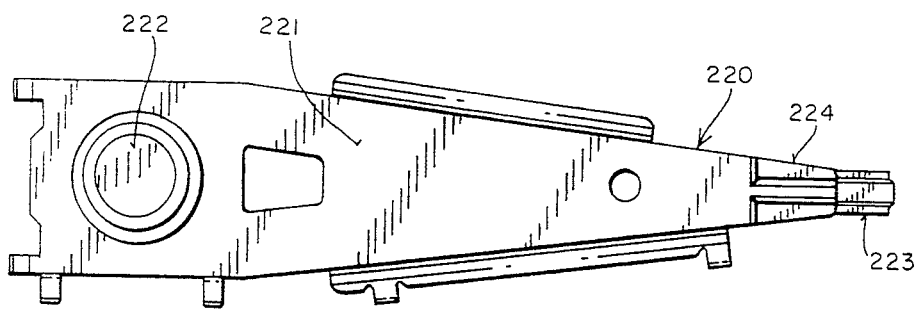
FIG_2A
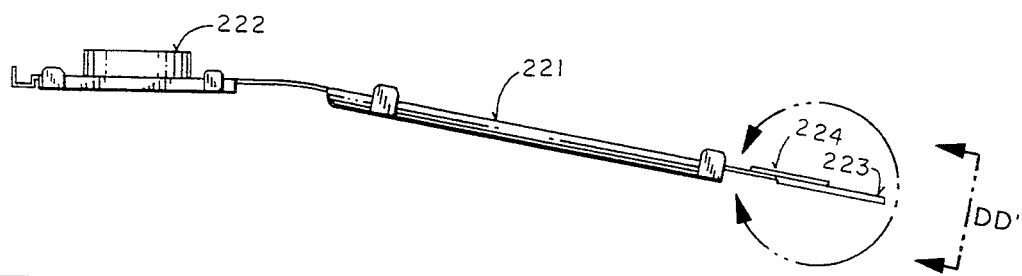
FIG_2B
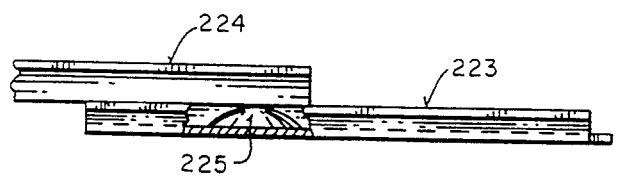
FIG_2C
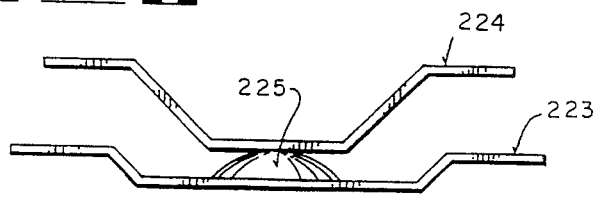
FIG_3

ACCELERATION PROFILE

LOAD BEAM ACCELERATION PROFILE

APPARATUS AND METHOD FOR REDUCING EFFECTS OF SLIP/STICK IN A DISK DRIVE HEAD ASSEMBLY

FIELD OF THE INVENTION

The present invention pertains to the field of magnetic disk recorders. More particularly, the present invention relates to an apparatus and method for minimizing the effects of slip/stick in the head assembly of a magnetic disk recorder.

BACKGROUND OF THE INVENTION

In the field of computer systems, digital data is often written onto magnetic media, which retains the data so that it can later be retrieved. One such mass storage mechanism is known as a hard disk drive. Commonly, hard disk drives are comprised of a stack of circular disks mounted on a spindle. A motor rotates the disks about the spindle. A number of transducers, more commonly referred to as "heads," are used to both read digital data from and write digital data to the magnetic media coating the disks.

A servomechanism is used to locate the heads in reference to radial locations over the disk surface. The servomechanism instructs an actuator to reposition the heads from one radial location to the desired radial location. As the heads are moved radially across the spinning disks, a number of concentric rings are described. These concentric rings, containing the digital bits of data, are known as "tracks."

Typically, a head is housed in a slider. Sliders are designed to be lifted by the air flow produced by the rotating disks so that they "fly" over the surfaces of the magnetic disks. The goal of disk drive designers is to maintain the sliders at an optimum flying height in order to minimize read and write errors. This can be rather difficult, due to imperfections inherent in many disks. Disks can have variations in their thickness both along particular tracks and from their interior to their exterior.

In order to compensate for the uneven height variations found in many disks, flexures (also known as gimbal springs and suspensions) are often implemented. A slider is mounted at the tip of a flexure. The other end of the flexure is attached to the actuator. Flexures have the degree of flexibility necessary to pitch and roll with imperfections found in the disks. This is typically accomplished by implementing a dimple on the surface of the flexure. The dimple is a small, dome-shaped protrusion. The dimple's apex provides a contact point about which the slider can pitch and roll to accommodate variations in the topography of the disk.

However, there is a problem encountered with this type of head assembly during seek operations. When a computer directs the disk drive to position the head on a track different from the track wherein the head is presently positioned, the disk drive performs a "seek". The time required to perform a seek is a measurement of the level of performance of a disk drive. Fast seek times are prized because it translates into less time required to read and write the data, reducing the user's delay time. Hence, the heads are rapidly accelerated and then decelerated to quickly reposition the heads in an effort to minimize the seek time. This produces large acceleration and deceleration forces on the head assembly. The head is subjected to upwards of 200 Gs of acceleration. As a result, a seek can cause the slider to slip in a radial direction relative to the dimple. Friction can cause the slider to stick in that position, even after the seek has been completed. This undesirable phenomenon is known as the slip/stick problem.

The problem is that slip/stick occurrences can cause the slider to be off center to such a degree that the head is in an off track position. The effect is that although the actuator is moved to its correct location, the slider and the head are misaligned. This could cause track misregistration, resulting in read and write errors. Moreover, this problem is compounded by the fact that when the actuator is moved in one radial direction, the slider might slip and stick in that direction; yet if the actuator is subsequently moved in the opposite radial direction, the slider might slip and stick in the opposite radial direction. Further complicating matters is the possibility that the slider might slip and stick in one radial direction during a write operation, whereas it might Slip and stick in the opposite radial direction when attempting to read the written data. Given that the width of a track may be less than 500 minches, small displacements due to the slip/stick problem can cause an otherwise proper seek to fail.

Both linear and rotary actuators suffer from slip/stick problems. Whereas linear actuators move the heads along a straight radial line from the center of the disk, rotary actuators pivot about a point to swing the heads into position. Because rotary actuators typically have lower inertia in comparison to linear actuators, they can be moved and stopped more quickly, resulting in faster access times. However, the fast speed of rotary actuators produces larger acceleration and deceleration forces in the process of seeking a particular track. Hence, slip/stick problems are even more acute in disk drives having rotary type actuators.

One solution to the slip/stick problem is to increase the width of each track to provide greater tolerances for the placement of the heads. However, wide tracks occupy more room. Consequently, less data can be stored within a given disk area if wider tracks were implemented. In other words, this solution reduces the capacity of a disk for storing data.

Another proposed solution involves applying lubricant to the dimple area. However, this approach is typically unreliable due to inconsistent control of the lubricant characteristics. In addition, the lubricant might make the dimple more susceptible to corrosion.

Yet another prior art solution involves mounting the flexure at a ninety degree rotation to increase the flexure's lateral stiffness. However, this prior art solution could detrimentally impact the flexure's longitudinal characteristics. Furthermore, it typically requires additional hardware modifications.

Thus, what is needed is a mechanism for minimizing the effects of potential slip/stick occurrences while minimizing detrimental side effects. It would also be highly preferable if existing disk drive head assembly designs are not required to be modified.

SUMMARY AND OBJECTS OF THE INVENTION

In view of the problems associated with disk drive head assemblies, one object of the present invention is to reduce occurrences of track misregistration.

Another object of the present invention is to provide a mechanism for minimizing the effects of slip/stick problems associated with sliders and dimples in a disk drive's head assembly.

Another object of the present invention is to provide a mechanism for minimizing the effects of slip/stick without requiring modifications to existing hardware in the disk drive's head assembly.

These and other objects of the present invention are implemented in a magnetic disk drive system having seek trajectories modified to minimize track misregistrations due to the flexure slipping and sticking in a misaligned position. In a hard disk drive system, data is stored onto a stack of magnetic disks which rotate about a spindle. A rotary actuator assembly is used to hold and position a number of transducers over specified radial locations on the disks to access and store data in reference to particular tracks on the disks.

A transducer is mounted onto a slider which flies over the surface of a disk as the disk revolves. The slider is attached to one end of a flexure. The other end of the flexure is attached to a load member. The flexure has a protruding dimple which makes contact with the load member. This allows the flexure to pitch and roll about the dimple to accommodate for disk variations.

A servo mechanism directs the actuator assembly to move the heads in a particular trajectory according to the seek distance. The various trajectories are stored in ROM. Generally, the heads are accelerated until the approximate midpoint of the seek is reached. Thereupon, the heads are decelerated in a series of steps. As the heads closely approach the destination track (i.e., one track left to go), the trajectory specifies a sudden, brief surge of acceleration. This acceleration surge reverses the forces in the flexure, thereby overcoming the friction forces acting on the dimple contact point so that the flexure is restored to its centered position.

This process can be effectuated by increasing one trajectory entry in the ROM. Changing the trajectory produces a small damped oscillation in the current supplied to the voice motor used to move the actuator assembly. The resulting effect is a sudden surge of acceleration.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a perspective view illustrating a typical head gimbal assembly.

FIG. 2A is a top view illustrating the currently preferred head gimbal assembly.

FIG. 2B is a side view illustrating the currently preferred head gimbal assembly.

FIG. 2C is an exploded view illustrating the interaction between the load member and the flexure about the dimple point.

FIG. 3 is a cross-sectional view illustrating the load member, flexure and dimple of view D—D' in FIG. 2B.

DETAILED DESCRIPTION

Figure 4:
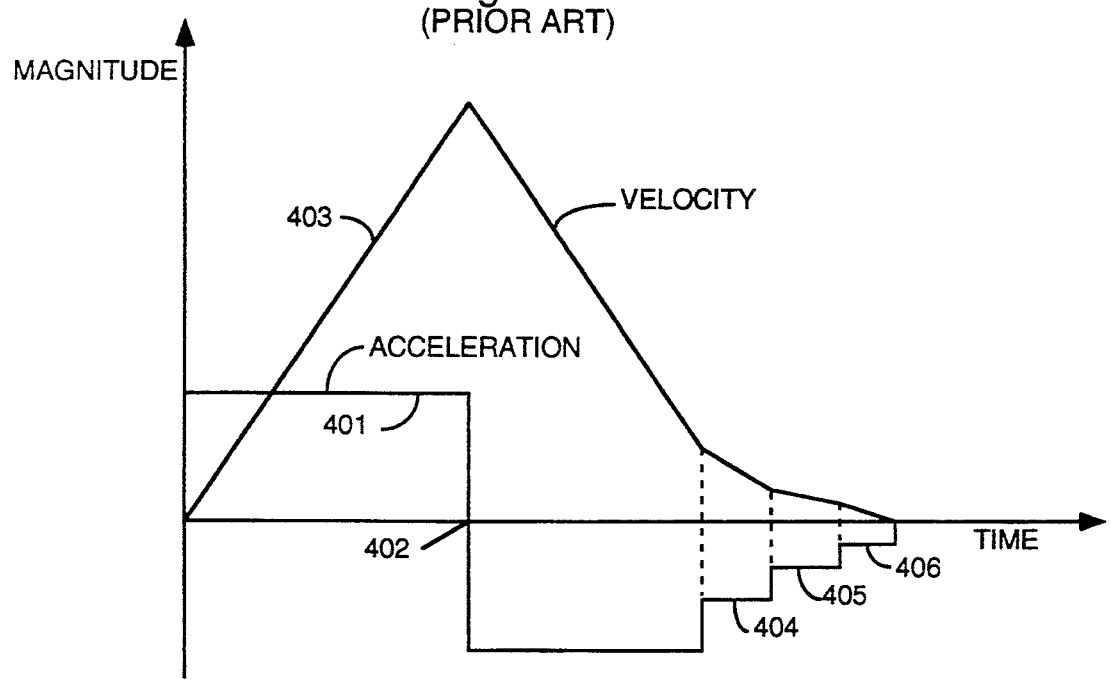
FIG. 4 is a plot of a typical prior art seek profile.

An apparatus and method for minimizing the effects of slip/stick problems in a magnetic disk drive is described. In the foregoing specification, the invention has beer described with reference to specific exemplary embodiment thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

FIG. 1 is a perspective view illustrating a typical head gimbal assembly comprising an actuator arm 111, flexure 112, gimbal 114, and slider 117 positioned over a magnetic disk 115. Slider 117 is comprised of a substantially rectangular body having a pair of parallel rails disposed along opposite sides of the slider body. A magnetic transducer element (not shown) is attached to the side of the slider body. The transducer is used to read and write binary data from/to the magnetic media coating disk 115. Gimbal 114 is attached to one end of a flexure 112. Flexure 112 exerts downward pressure on slider 114 so that slider 114 is forced against disk 115. The other end of flexure 112 is attached to the tip of an actuator arm 111. The actuator arm 111 may rotate about a pivot. Thereby, as the servomechanism pivots the actuator arm 111 it causes the slider 117 and ultimately the transducer to be swept radially across the top of disk 115 in the process of seeking a particular track. Once the transducer has been placed over the desired track, data contained within that track is accessed while disk 115 rotates.

FIG. 2A is a top view illustrating the currently preferred head gimbal assembly 220 attached to flexure 221, which in turn attaches to an actuator arm at 222.

FIG. 2B is a side view illustrating the currently preferred head gimbal assembly 220. Load member 224 is attached to the tip of flexure 221. Flexure 221 is fixed to actuator arm at 222. The slider (not shown) is coupled to flexure at 223.

FIG. 2C is an exploded view illustrating the interaction between load member 224 and slider 223. Dimple 225 is implemented on slider 223 so that its apex makes contact with load member 224. This allows the slider to pitch and roll to accommodate for variations in the topography across the magnetic disk. The slider pivots about the dimple's contact point as it pitches and rolls.

FIG. 3 is an exploded cross-sectional DD' view illustrating load member 224, flexure 223, and dimple 225. The quick starts and stops of the rotary actuator during a seek operation exerts lateral forces in either direction on the slider and which can cause Flexure 223 along with dimple 225 to slide laterally with respect to load member 224. Dimple 225 might stick in this off center position due to friction between dimple 225 and load member 224.

In the currently preferred embodiment of the present invention, a small damped oscillation is introduced in the current to the voice coil controlling the movement of the head gimbal assembly towards the end of a seek. This current causes the voice coil to jerk the actuator and produces a countering force, thereby aiding the restoration of the dimple back to its center line position. This is accomplished by designing a seek profile to include the kick back towards the end of the seeks.

A seek profile describes the trajectory of the head for a given seek. The seek profile defines the magnitude of the acceleration and velocity of the head as a function of time. Typically, seek profiles subject the head to a high constant rate of acceleration followed by a specified period of deceleration. The accelerations, velocities, durations, etc. for a given profile are predetermined and are based on mathematical calculations. For each seek of different length, there exists a corresponding profile for that seek. These profiles are stored in look-up tables, which are programmed into a Read Only Memory (ROM) semiconductor chip. At the beginning of each seek, the profile corresponding to the desired seek length is looked up and executed.

FIG. 4 is a plot of a profile illustrating a typical seek. The head is first subjected to a constant rate of acceleration 401. With constant acceleration, the head's velocity 403 increases linearly. Once the approximate midpoint 402 is reached, the head is decelerated for a specified duration. The deceleration occurs in steps 404-406 in order to minimize the mechanical resonances in the actuator used to move the head. The slope of the velocity 403 decreases correspondingly, until the head comes to a stop at the destination track.

Figure 5:
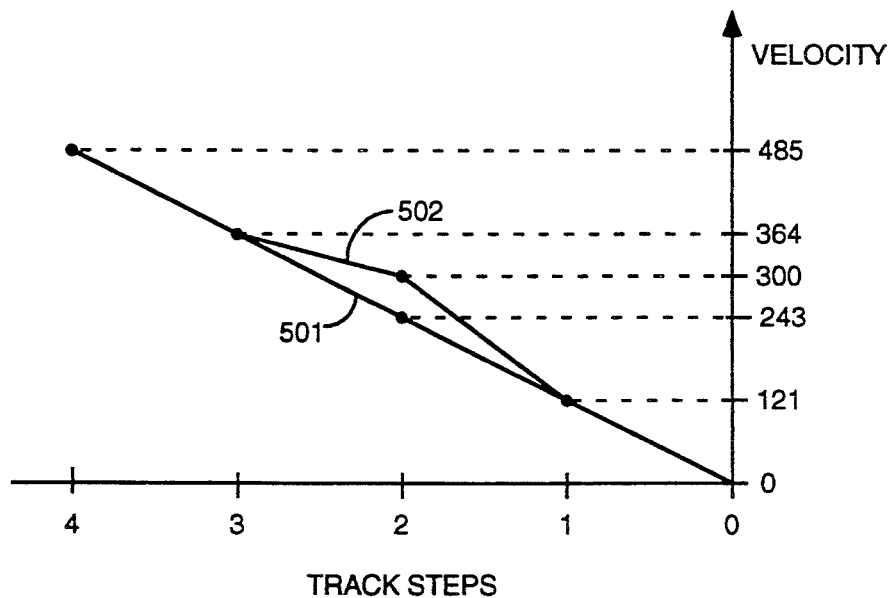
FIG. 5 is a plot of a profile of the last part of the currently preferred seek trajectory.

FIG. 5 is a plot of a profile of the tail end of the currently preferred seek trajectory. The x-axis is a function of track steps, wherein each increment corresponds to 0.5426 of a track. The y-axis is a function of velocity, wherein 1,024 corresponds to one track per 53 msec. A prior art trajectory 501 is shown. The currently preferred trajectory 502 which introduces the kick back feature of the present invention is also shown. Changing just one trajectory point is often sufficient to produce the kick back effect for restoring the dimple to its original centerline position.

Figure 6A:
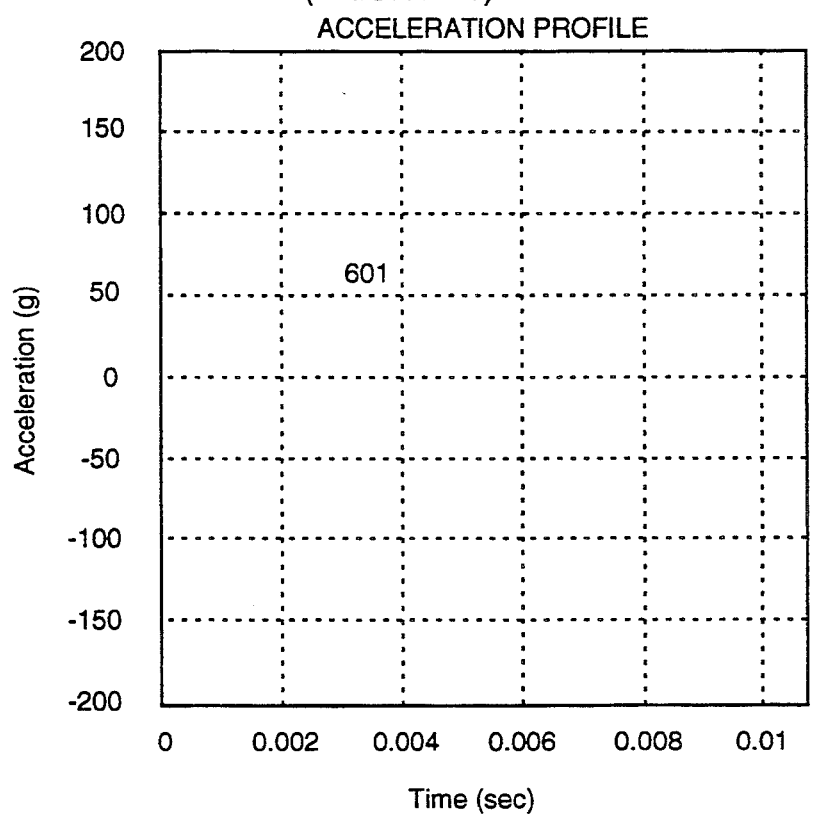
FIG. 6A is a plot illustrating the acceleration profile of a prior art seek.

FIG. 6A is a plot 601 illustrating the acceleration profile as specified by a prior art trajectory. It can be seen that the initial acceleration and subsequent deceleration is relatively smooth.

Figure 6B:
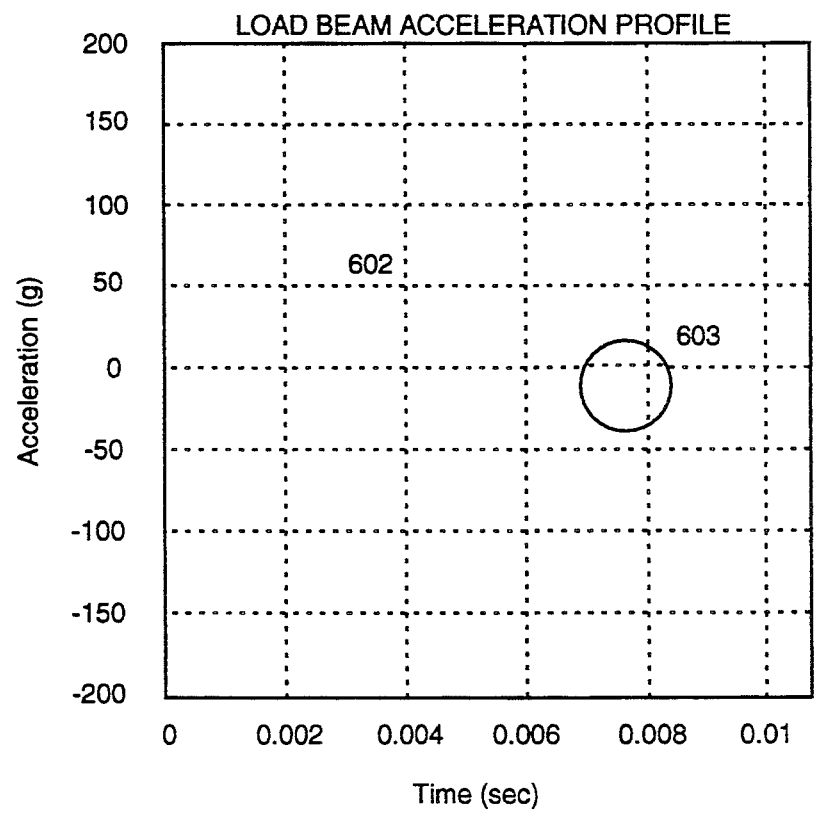
FIG. 6B is a plot illustrating the acceleration profile according to the currently preferred embodiment of the present invention.

In comparison, FIG. 6B is a plot 602 illustrating the acceleration profile as specified by the currently preferred trajectory of the present invention. Note that there is a deceleration spike 603 towards the end of the seek. As a result, this causes the actuator to kick back.

Figure 7A:
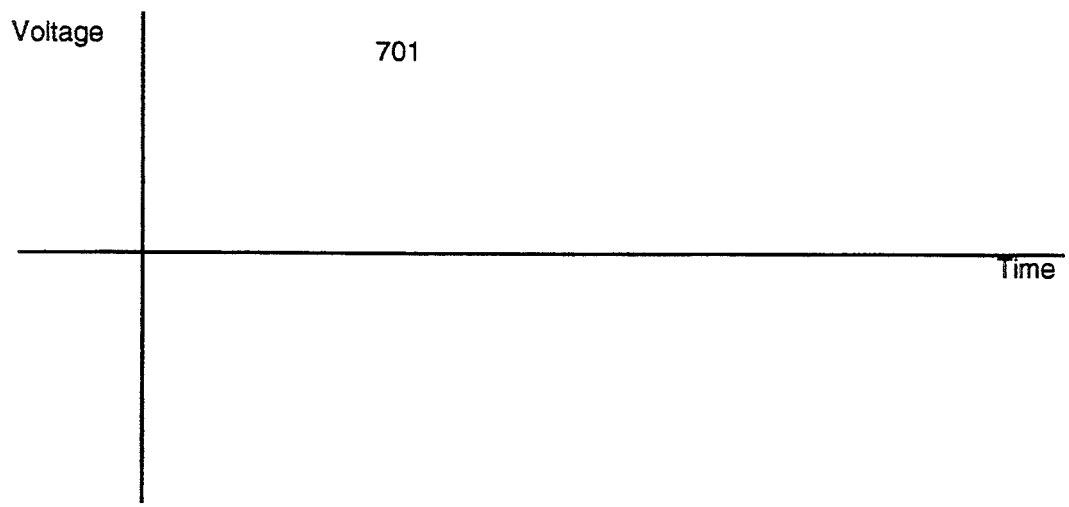
FIG. 7A is a plot illustrating the voltage applied to the voice motor for a prior art trajectory.

FIG. 7A is a plot 701 illustrating the voltage applied to the voice motor for a typical prior art trajectory. Positive voltage is applied for approximately the first half of the seek to accelerate the actuator. At the approximate midpoint, the polarity is reversed to decelerate the actuator.

Figure 7B:
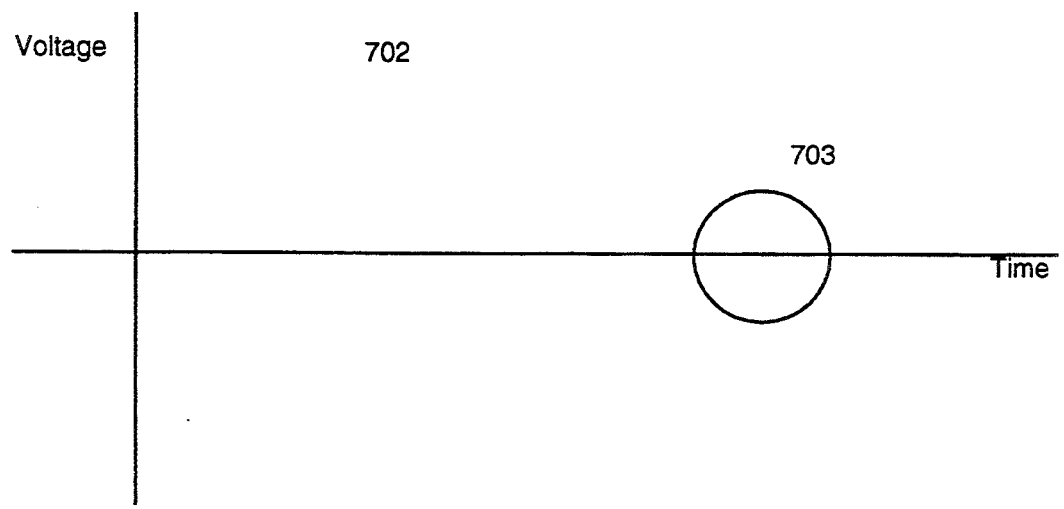
FIG. 7B is a plot illustrating the voltage applied to the voice motor according to the currently preferred embodiment of the present invention.

In contrast, FIG. 7B is a plot 702 illustrating the voltage applied to the voice motor as specified by the currently preferred trajectory of the present invention. Note the negative voltage spike 703 resulting from the trajectory contained in the ROM. This Negative spike 703 corresponds to the deceleration spike and kick back discussed above.

It should be noted that a larger deflection in the deceleration trajectory produces a larger kick back effect. In turn, a larger kick back is more likely to compensate for any dimple deviations due to slip/stick. However, there is the possibility that larger kick backs may induce an unacceptable degree of residual vibration in the actuator which may lengthen the setting time. In the currently preferred embodiment, the profile entry corresponding to the 1 track-to-go position is increased by approximately 44%.

Figure 8A:
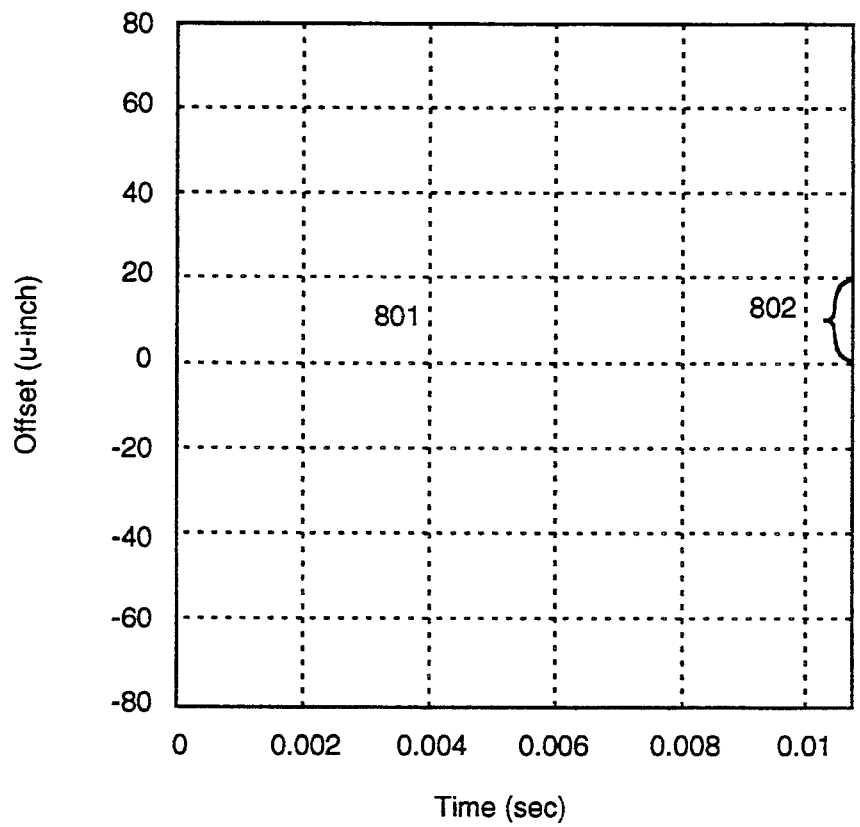
FIG. 8A is a plot illustrating a simulated dimple to beam member offset occurring during a seek.

FIG. 8A is a plot illustrating a simulated dimple to beam member offset 801 for a typical seek. In the simulation, the following parameters and variables are defined as follows:

$K_{flex} = 6300$ N/m Lateral Stiffness of 0.0020" Flexure
$M_s = 0.015$ gm Slider Mass
$J = 8.03 \times 10^{-6}$ kg m² Actuator Inertia
$R_a = 0.05496$ m Pivot to Slider Distance
$F_n = 0.0687$N Gram Load
$m_s = 0.2$ Nominal Dimple Static Friction Coefficient
$m_s = 0.107$ Nominal Dimple Kinetic Friction Coefficient (B. Lien, HTI)
$K_t = 0.235$N m/rad Torque Factor The offset 801 is described in minches as a function of time. It can be seen that as the actuator assembly is accelerated, the offset 801 can be as high as $-50$ minches from the center. Later, when decelerating, the offset can be $+50$ minches in the other direction. When the actuator assembly comes to rest at the destination track, the offset 802 remains at approximately 20 minches.

Figure 8B:
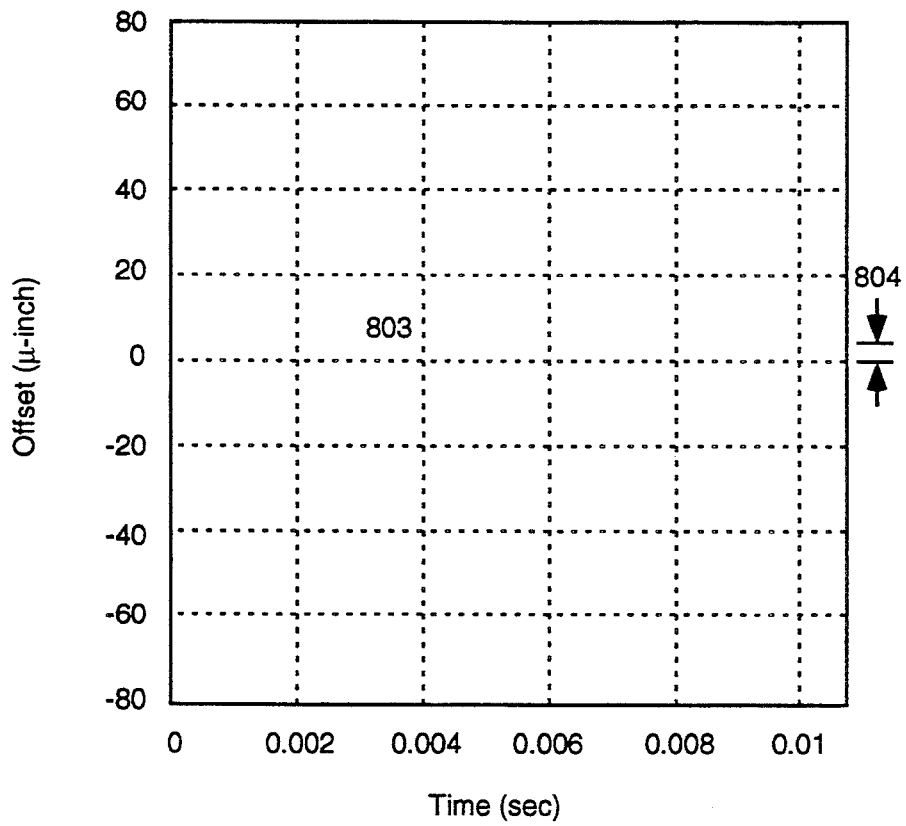
FIG. 8B is a plot illustrating a simulated dimple to beam member offset for a seek employing a 44% trajectory kick back of the present invention.

FIG. 8B is a plot illustrating a simulated dimple to beam member offset 803 for a typical seek employing a 44% trajectory kick back of the present invention. It can be seen by comparing FIGS. 8A and 8B that the two offset profiles 801 and 803 are similar, except that the final offset 804 of the present invention has been minimized to being just approximately 8 minches.

Figure 9:
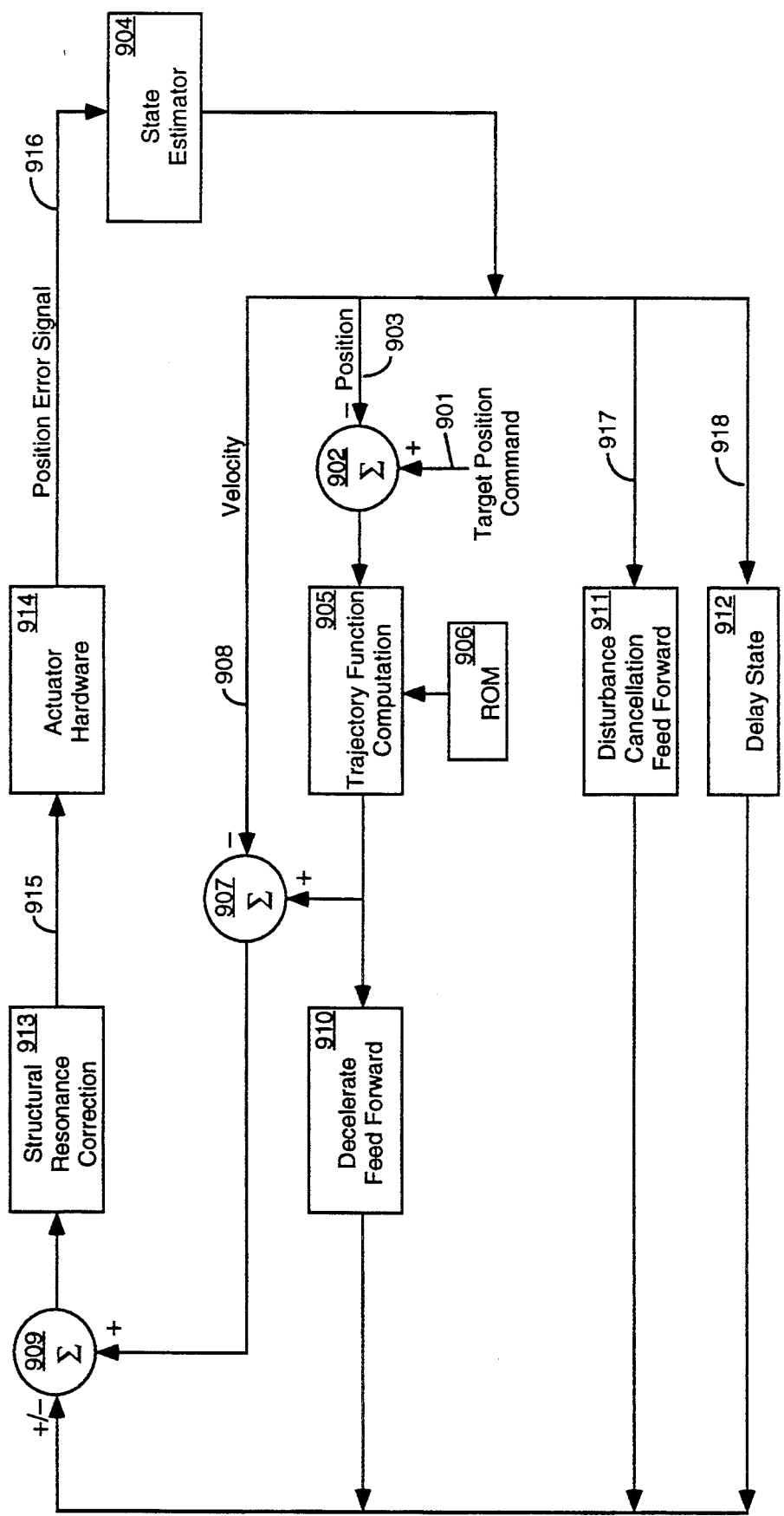
FIG. 9 is a block diagram illustrating a servo mechanism for controlling the position of the head in a seek operation.

FIG. 9 is a block diagram illustrating a servo mechanism for controlling the position of the head in a seek operation. When a computer wishes to access a particular track in order to read or write data from/to that track, it sends a target position command on line 901 to the disk drive system. Summer 902 compares the target position to the actual position on line 903 given by the signal from state estimator 904. The difference between these two signals represents the distance from where the head is presently located to the destination track. This distance is fed into the non-linear trajectory function computation block 905. Trajectory computation block 905 looks up the velocity trajectory corresponding to the seek distance in ROM 906. ROM 906 contains profile tables specifying all the different trajectories as a function of seek distances. The trajectories in ROM 906 incorporate the deflections during deceleration which produces the kick backs for compensating slip/stick problems.

Once the appropriate trajectory is found, it is sent to summer 907. The signal representing the present velocity of the head is output by state estimator 904 onto line 908 and is also input to summer 907. Summer 907 takes the difference between the desired trajectory velocity and the present actual velocity. This difference in velocities is input to summer 909. In addition, other signals from the decelerate feedforward 910, disturbance cancellation feedforward 911, and delay state 912 blocks are input to summer 909 to compensate for external forces, such as those due to the flex circuits used to electrically couple the heads to the printed circuit board. The output signal from summer 909 is adjusted for structural resonances by the structurally resonance correction block 913.

The corrected signal is input to both the voice coil to control the actuator hardware 914 and the state estimator 904. The velocity of the actuator, and hence, the heads, is adjusted according to the signal on line 915. During the seek, the heads read position information off the magnetic disks. A position error signal is a periodic sinusoidal signal which is proportional to the relative distance of the positions of the heads to the nearest track center. State estimator 904 takes the adjusted trajectory signal from line 915 and models the behavior of the actuator. The ideal situation is brought in line with the actual situation by factoring in the position error signal on line 916. In turn, state estimator 904 generates the velocity, position, disturbance bias, and delay state signals on lines 908, 903, 917, and 918. These signals are used in calculating how the velocity should be modified to match the desired profile. This procedure is repeated throughout the seek until the destination track is reached. In essence, the seek is performed in a closed loop implementation, wherein the actuator's position and velocity is known throughout the entire seek and is adjusted so as to follow the seek profile.

Figure 10:
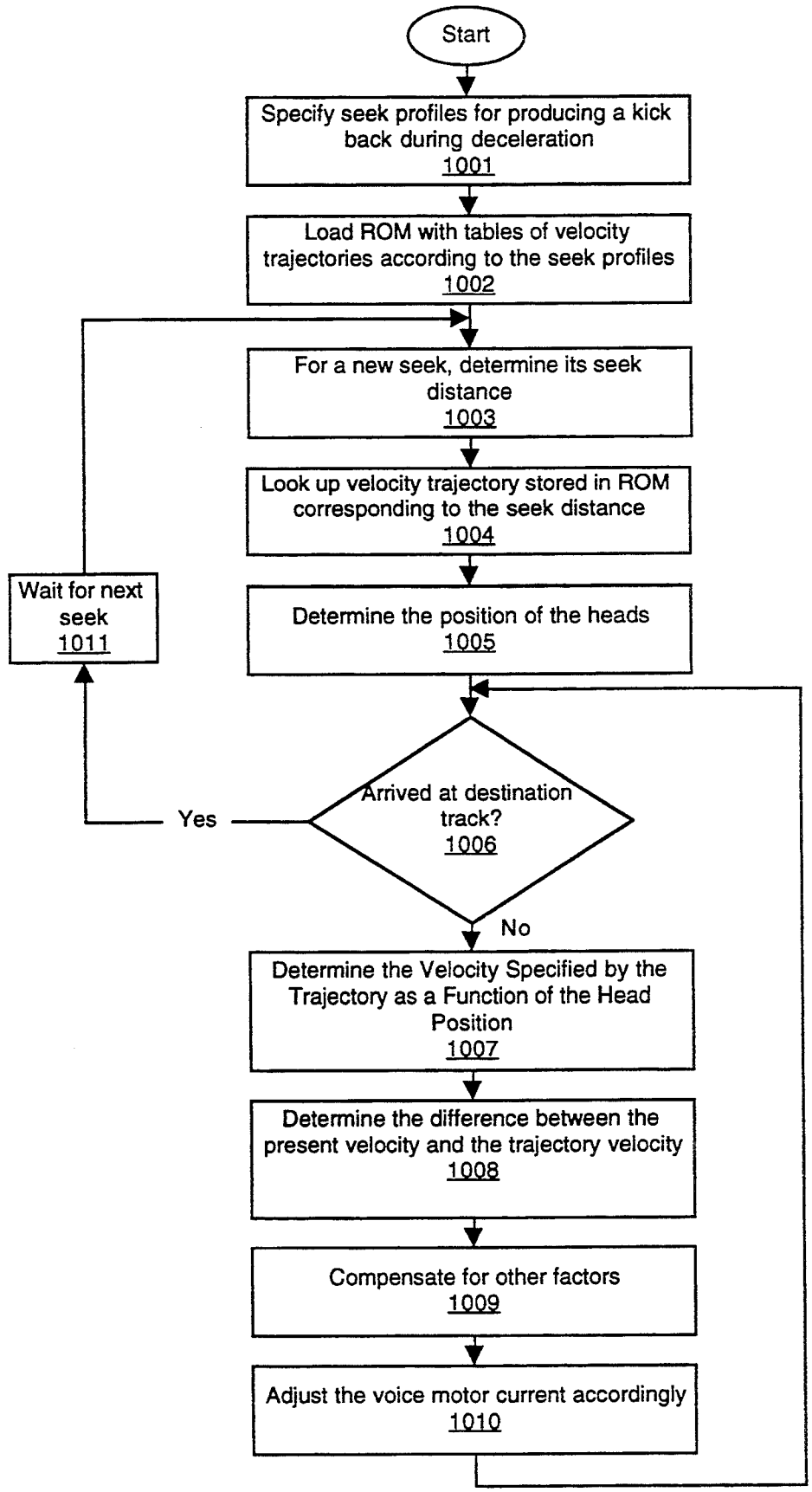
FIG. 10 is a flowchart illustrating the steps of the present invention for producing a kick back force on the slider to compensate for slip/stick problems.
Figure 6A:
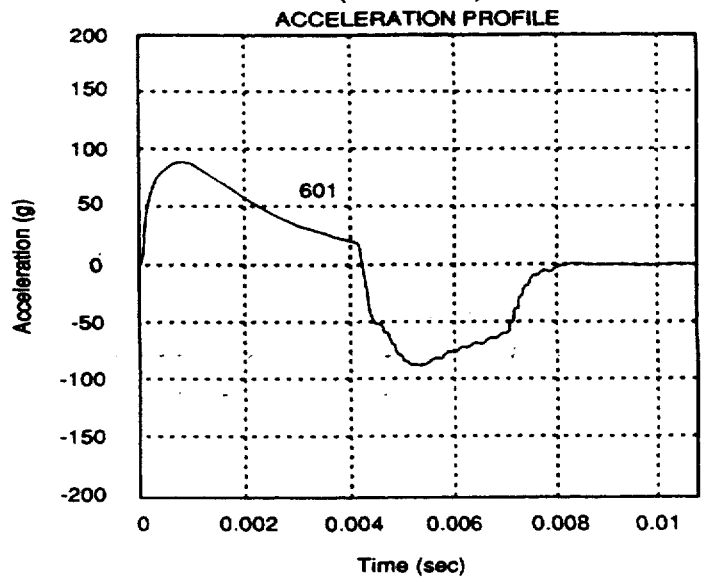
Figure 6B:
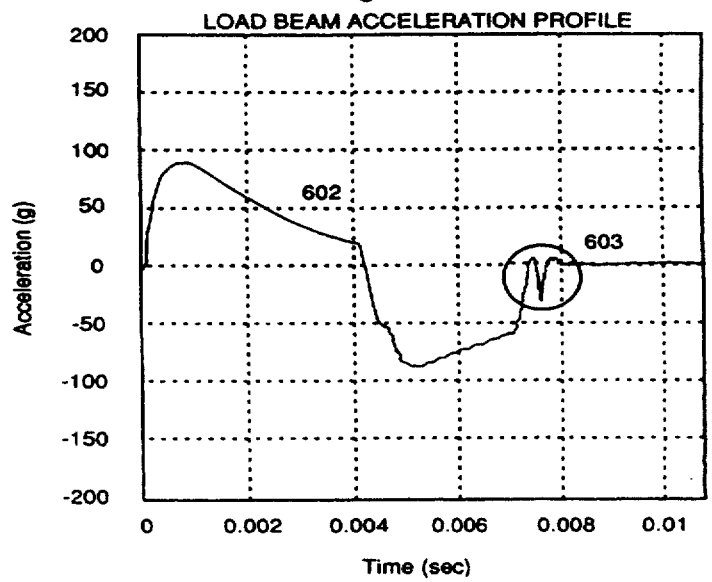
Figure 7A:
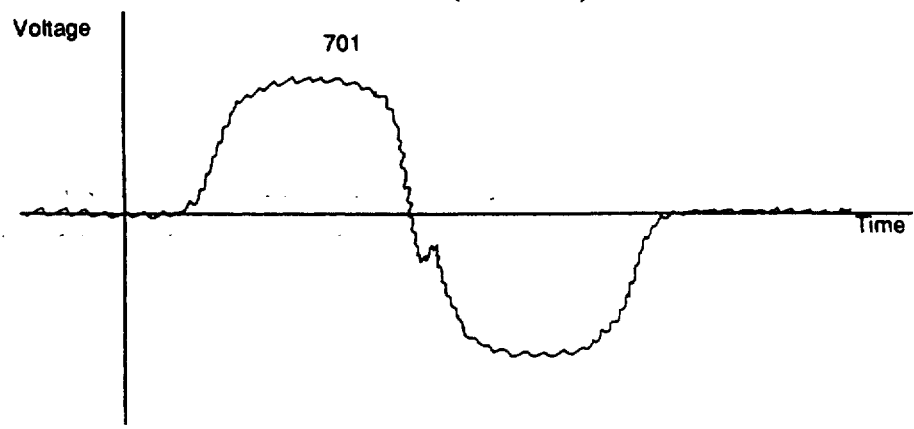
Figure 7B:
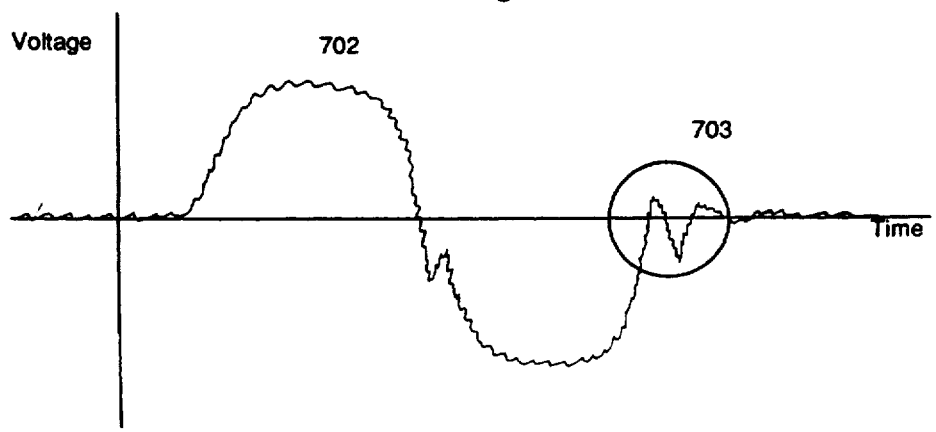
Figure 8A:
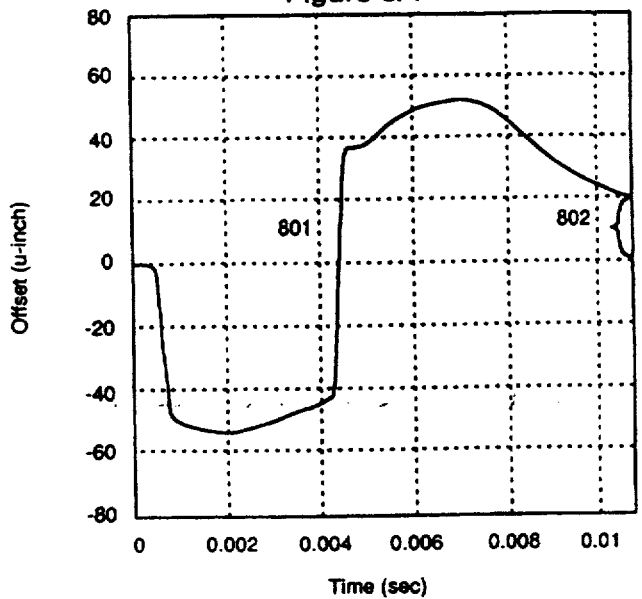
Figure 8B:
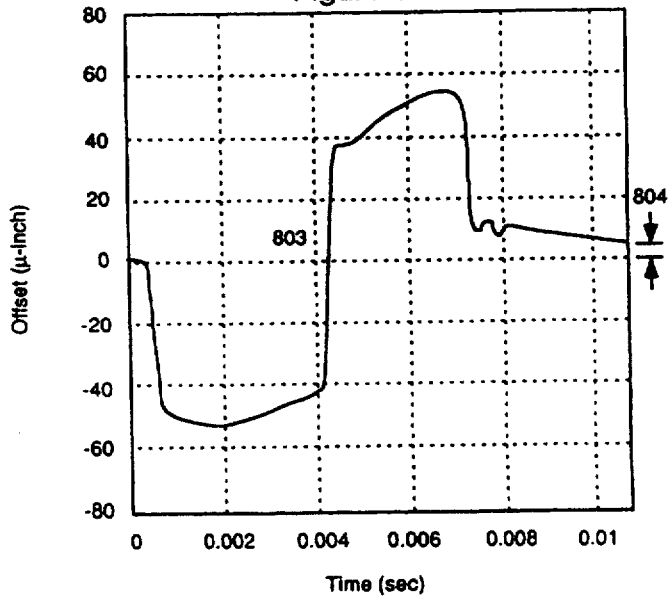

FIG. 10 is a flowchart illustrating the steps of the currently preferred embodiment of the present invention for producing a kick back force on the slider to compensate for any slip/stick problems. Initially, the seek profiles are determined empirically in order to produce the kick back during the deceleration process, step 1001. A ROM is loaded with velocity values defining trajectories corresponding to the seek profiles, step 1002. For a new seek, the distance for that seek is determined in step 1003: The trajectory corresponding to the seek distance is looked up in the ROM, step 1004. The position of the heads is determined, step 1005. A determination is made as to whether the head has arrived at the destination track, step 1006. If so, the velocity specified by the trajectory as a function of the head position is determined, step 1007. The difference between the present velocity and the trajectory velocity is determined, step 1008. Other factors are compensated for, step 1009. The head velocity is adjusted accordingly, step 1010. Step 1006 is repeated. Once the head arrives at the destination track as determined in step 1006, the disk drive waits for the next seek, step 1011. A new seek results in performing steps 1003 and 1011 for that seek.

Thus, an apparatus and method for minimizing the effects of slip/stick problems in a disk drive head assembly by introducing a kick back force described in the seek profile is disclosed.

What is claimed is:

1. A disk storage system having a disk comprised of a plurality of tracks for storing digital data, comprising:
   a transducer for reading data from and writing data to said tracks of said disk;
   an actuator assembly for moving said transducer from a first track to a second track having:
   a slider coupled to said transducer for locating said transducer close to a surface of said disk;
   a flexure coupled to said slider for allowing said slider to
   maintain a substantially constant height in reference to said disk;
   a servo for accelerating and decelerating said actuator assembly according to a predetermined profile specifying how said transducer is to be moved, wherein as said transducer approaches said second track, said servo abruptly accelerates said transducer for a predetermined duration according to said profile to minimize offsets between said flexure and said load member.

2. The disk storage system of claim 1, wherein at approximately one track prior to said second track, said profile corresponds to a velocity of approximately three-tenths of a track per fifty-three microseconds.

3. The disk storage system of claim 2, wherein said profile is stored in read only memory (ROM).

4. In a magnetic recording system having a magnetic medium comprising a plurality of tracks for storing binary information, a read/write means for reading binary information from and writing binary information to said magnetic medium, and a means for positioning said read/write means over a particular portion of said magnetic medium, a method of moving said read/write means from a starting track to a destination track and properly aligning said read/write means to a center of said destination track, comprising the steps of:
   loading a memory means with a plurality of profiles which define acceleration and deceleration of said read/write means as a function of a distance said read/write means is to be moved;
   determining a distance from said starting track to said destination track;
   locating a profile from said memory means corresponding to said distance;
   accelerating said read/write means until said read/write means is moved to an approximate midpoint of said distance;
   decelerating said read/write means according to said profile, wherein said deceleration is gradually decreased as said read/write means approaches said destination track;
   abruptly accelerating said read/write means for a predetermined duration according to said profile prior to reaching said destination track for minimizing misalignment in said positioning means.

5. The method of claim 4, wherein said abrupt accelerating step is comprised of reversing polarity of voltage applied to said positioning means.

6. The method of claim 5, wherein said ,abrupt acceleration is increased by increasing a voltage applied to said positioning means.

7. The method of claim 6, wherein said abrupt acceleration step occurs approximately one track prior to said destination track.

* * * * *

UNITED STATES PATENT AND TRADEMARK OFFICE
CERTIFICATE OF CORRECTION

PATENT NO. : 5,396,379
DATED : March 7, 1995
INVENTOR(S) : Mike J. Mayo

It is certified that error appears in the above-identified patent and that said Letters Patent is hereby corrected as shown below:

The title page should be deleted to appear as per attached title page.

Delete Drawing Sheets 4-6, and substitute therefor the Drawing Sheets, consisting of Figs. 6A-6B, 7A-7B, and 8A-8B, as shown on the attached pages.

Column 4, line 20, delete "beer" and insert --been-- therefor.

Signed and Sealed this

Fifteenth Day of September, 1998

Attest:

BRUCE LEHMAN

Attesting Officer

Commissioner of Patents and Trademarks

United States Patent [19]

Mayo

[11] Patent Number: 5,396,379
[45] Date of Patent: Mar. 7, 1995

[54] APPARATUS AND METHOD FOR REDUCING EFFECTS OF SLIP/STICK IN A DISK DRIVE HEAD ASSEMBLY

[75] Inventor: Mike J. Mayo, Palo Alto, Calif.

[73] Assignee: Maxtor Corporation, San Jose, Calif.

[21] Appl. No.: 979,600

[22] Filed: Nov. 20, 1992

[51] Int. Cl.⁶ .............................................. G11B 5/596
[52] U.S. Cl. ............................ 360/78.07; 360/78.06; 360/78.04
[58] Field of Search ............... 360/78.06, 78.07, 78.09, 360/78.04; 369/44.29

[56] References Cited

U.S. PATENT DOCUMENTS

| | | | |
|---|---|---|---|
| 4,591,933 | 5/1986 | Quackenbush | 360/78.07 |
| 4,899,234 | 2/1990 | Genheimer | 360/78.06 |
| 5,119,250 | 6/1992 | Green et al. | 360/78.06 |
| 5,126,897 | 6/1992 | Ogawa et al. | 360/78.09 |
| 5,150,266 | 9/1992 | Albert | 360/78.04 |
| 5,220,547 | 6/1993 | Yasukawa et al. | 360/78.04 X |

OTHER PUBLICATIONS

National Technical Report, Apr. 1989, Moriya et al., "CMF Actuator High Speed Access System". pp. 165-171.

Primary Examiner—Aristotelis Psitos
Assistant Examiner—James T. Wilson
Attorney, Agent, or Firm—Blakely, Sokoloff, Taylor & Zafman

[57] ABSTRACT

A disk storage system having a mechanism for minimizing effects of slip/stick in a disk drive head assembly. A transducer is used to read data from and write data to a rotating disk. An actuator assembly holds the transducer. The actuator assembly is comprised of a load member onto which a flexure is attached. A slider is mounted onto the flexure. The transducer is mounted onto the slider. In this manner, the transducer can pitch and roll to maintain a constant height in reference to the disk's surface. A servo mechanism controls the acceleration and deceleration of the head according to a predetermined seek profile specifying how the transducer is to be moved for a particular seek. As the transducer approaches the destination track, the profile calls for a sudden deceleration surge in order to compensate for misalignments occurring during the seek due to the flexure slipping laterally in reference to the load member and sticking in that position because of friction.

7 Claims, 8 Drawing Sheets

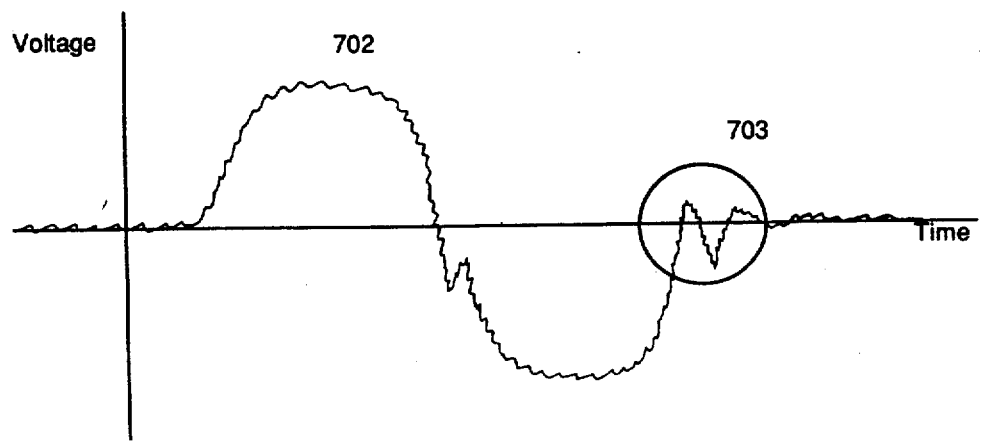

Figure 7B